United States Patent
Looijmans et al.

(10) Patent No.: US 7,224,654 B2
(45) Date of Patent: May 29, 2007

(54) DISC DRIVE APPARATUS

(75) Inventors: Hendrikus Albertus Johanna Looijmans, Eindhoven (NL); Cornelius Antonius Hezemans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 66 days.

(21) Appl. No.: 10/522,300

(22) PCT Filed: Jul. 10, 2003

(86) PCT No.: PCT/IB03/03194

§ 371 (c)(1),
(2), (4) Date: Jan. 25, 2005

(87) PCT Pub. No.: WO2004/013851

PCT Pub. Date: Feb. 12, 2004

(65) Prior Publication Data

US 2006/0072383 A1    Apr. 6, 2006

(30) Foreign Application Priority Data

Jul. 30, 2002   (EP)   .................... 02078131

(51) Int. Cl.
*G11B 7/00*   (2006.01)
(52) U.S. Cl. .................. 369/53.18; 369/53.37
(58) Field of Classification Search ............ 369/44.11, 369/44.14, 53.18, 53.37
See application file for complete search history.

(56) References Cited

U.S. PATENT DOCUMENTS

| | | | | |
|---|---|---|---|---|
| 5,636,193 A | * | 6/1997 | Ohmi | 369/53.42 |
| 5,796,687 A | * | 8/1998 | Baba | 369/44.29 |
| 6,009,053 A | * | 12/1999 | Ota et al. | 369/44.32 |
| 6,377,527 B1 | | 4/2002 | Hirashima | |
| 2001/0026509 A1 | * | 10/2001 | Kimikawa | 369/44.32 |
| 2002/0159351 A1 | * | 10/2002 | Tateishi | 369/47.45 |
| 2003/0210620 A1 | * | 11/2003 | Yamanaka | 369/44.32 |

FOREIGN PATENT DOCUMENTS

| | | |
|---|---|---|
| EP | 1049086 | 11/2000 |
| JP | 10092095 | 4/1998 |
| JP | 11328830 | 2/2000 |
| JP | 2001067680 | * 3/2001 |
| JP | 2000348428 | 4/2001 |

* cited by examiner

*Primary Examiner*—Wayne Young
*Assistant Examiner*—Linh T. Nguyen
(74) *Attorney, Agent, or Firm*—Michael E. Belk

(57) ABSTRACT

An optical disc drive apparatus (1) comprises: rotating means (4) for rotating an optical disc (2); a sledge (10) radially displaceable with respect to an apparatus frame (3); a platform (20) radially displaceable with respect to said sledge (10); an optical system (30) for scanning a disc, the optical system (30) defining an optical path (80) which is substantially fixed with respect to the sledge (10) and comprising an optical element (34) which is fixed with respect to the platform (20); an optical detector (35) fixed to said sledge (10); vibration detection means for detecting vibrations caused by the rotating disc; said vibration detection means comprising radial displacement detection means for detecting a radial displacement of said platform (20) with respect to said sledge (10).

19 Claims, 3 Drawing Sheets

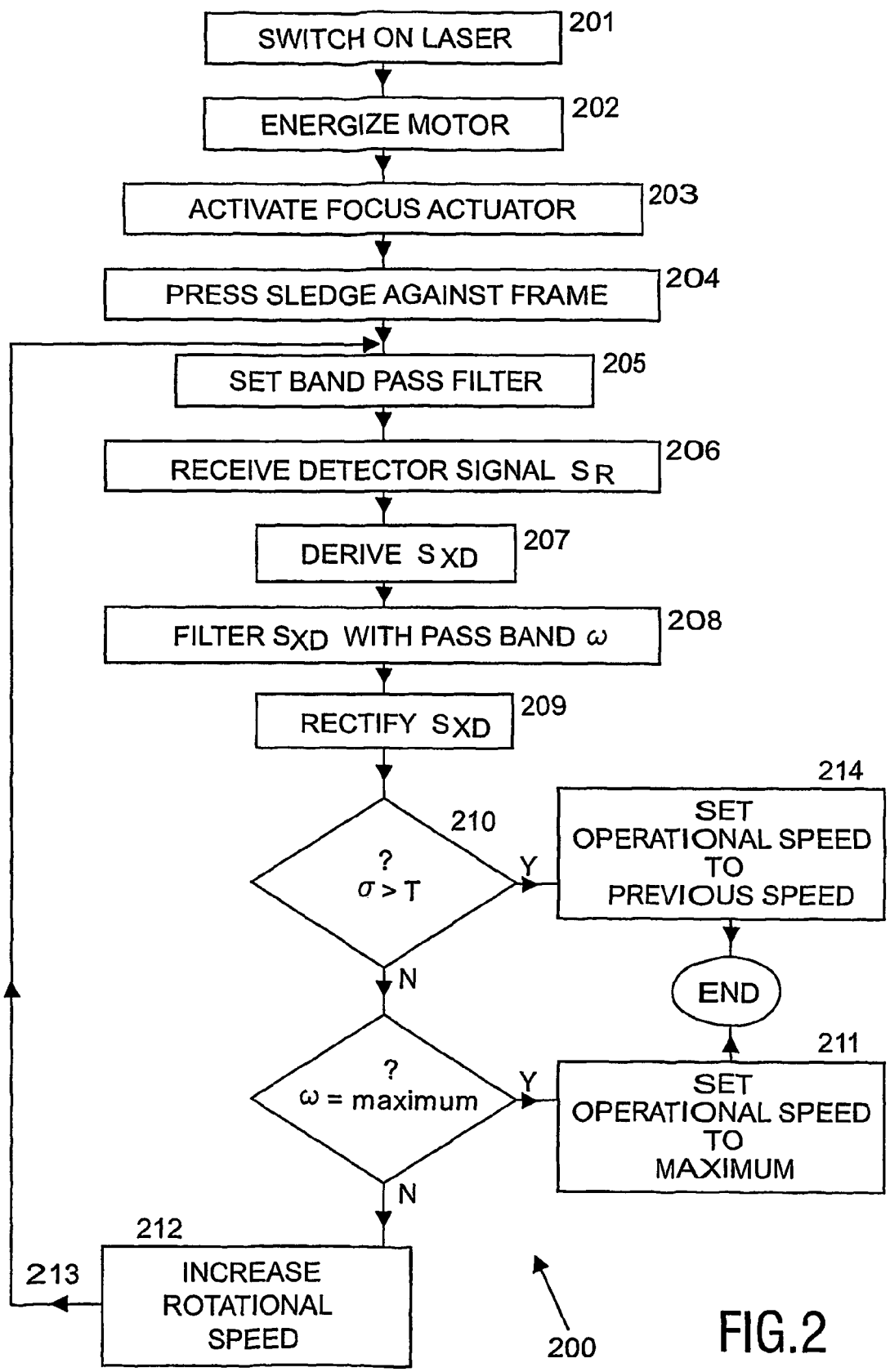

DISC DRIVE APPARATUS

Figure 1A:
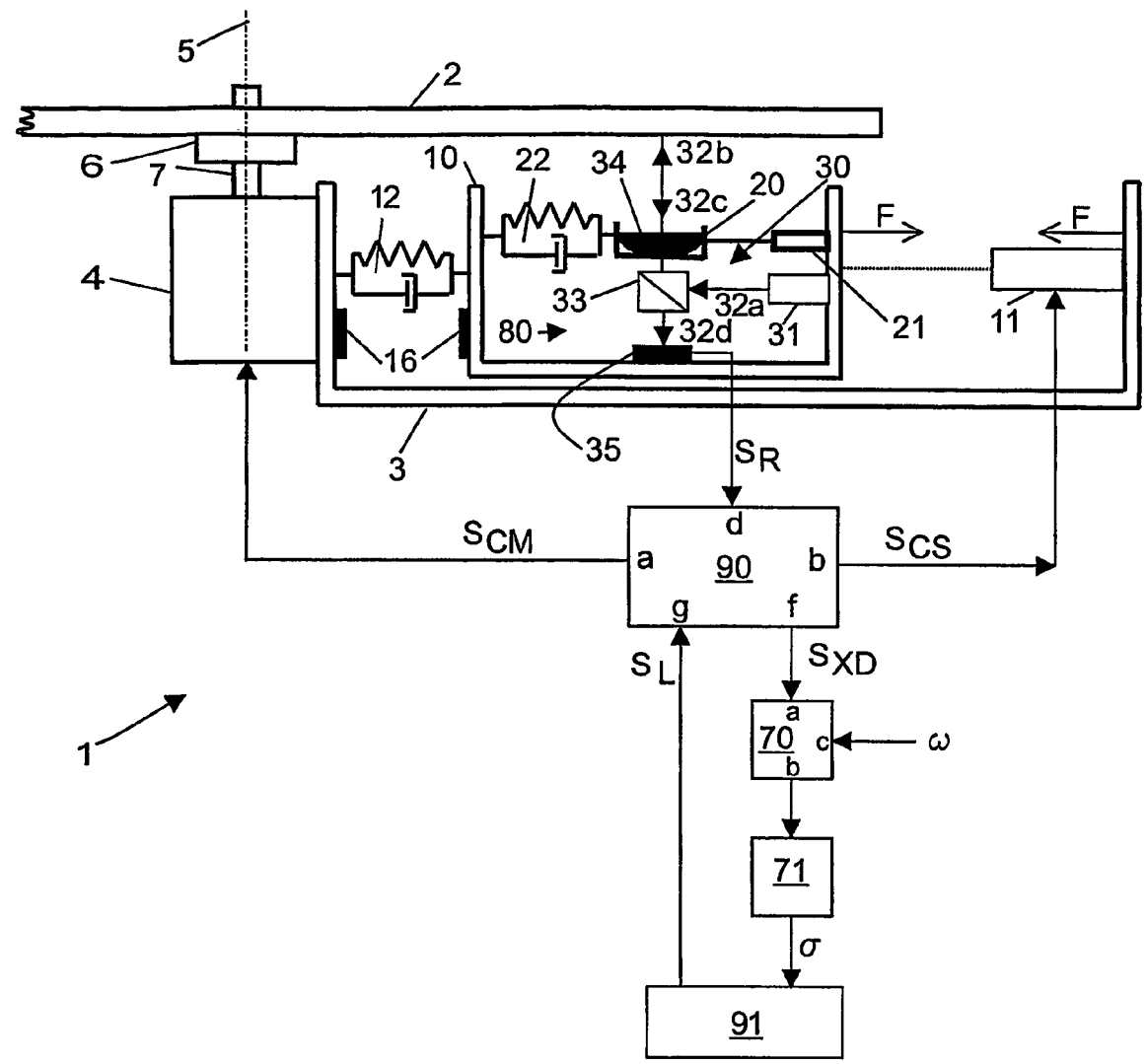

The present invention relates in general to disc drive systems for storing information onto a disc-shaped storage medium or reading information from such disc-shaped storage medium, where the disc is rotated and a write/read head is moved radially with respect to the rotating disc. Although the present invention is also applicable in the case of magnetic disc systems, the present invention is specifically relating to optical or magneto-optical disc systems. Hereinafter, the present invention will be explained specifically for the case of an optical disc system, but it is to be understood that it is not intended to restrict the invention to optical disc systems.

As is commonly known, an optical storage disc comprises at least one track, either in the form of a continuous spiral or in the form of multiple concentric circles, of storage space where information may be stored. Optical discs may be read-only type, where information is recorded during manufacture, which data can only be read by a user. The optical storage disc may also be a writable type, where information may be stored by a user. For writing information in the storage space of the optical storage disc, or for reading information from the disc, an optical disc drive comprises, on the one hand, rotating means for receiving and rotating an optical disc, and on the other hand optical means for generating an optical beam, typically a laser beam, and for scanning the storage track with said laser beam. Since the technology of optical discs in general, the way in which information can be stored in an optical disc, and the way in which optical data can be read from an optical disc, is commonly known, it is not necessary here to describe this technology in more detail.

For receiving the optical disc, an optical disc drive usually comprises a carrier tray which is displaceable between a receiving position where the tray is located outside a disc drive housing so that a user can place a disc, and a scanning position where the disc is located inside said disc drive housing and can be rotated by the rotating means and accessed by the optical head.

For rotating the optical disc, an optical disc drive typically comprises a motor, which drives a hub engaging a central portion of the optical disc. Usually, the motor is implemented as a spindle motor, and the motor-driven hub may be arranged directly on the spindle axle of the motor.

For optically scanning the rotating disc, an optical disc drive comprises a light beam generator device (typically a laser diode), an objective lens for focussing the light beam in a focal spot on the disc, and an optical detector for receiving the reflected light reflected from the disc and for generating an electrical detector output signal.

During operation, the light beam should remain focussed on the disc. To this end, the objective lens is arranged axially displaceable, and the optical disc drive comprises focal actuator means for controlling the axial position of the objective lens. Further, the focal spot should remain aligned with a track or should be capable of being positioned with respect to a new track. To this end, at least the objective lens is mounted radially displaceable, and the optical disc drive comprises radial actuator means for controlling the radial position of the objective lens.

More particularly, the optical disc drive comprises a sledge which is displaceably guided with respect to a disc drive frame, which frame also carries the spindle motor for rotating the disc. The travel course of the sledge is arranged substantially radially with respect to the disc, and the sledge can be displaced over a range substantially corresponding to the range from inner track radius to outer track radius. Said radial actuator means comprise a controllable sledge drive, for instance comprising a linear motor, a stepper motor, or a worm gear motor.

The displacement of the sledge is intended for roughly positioning the optical lens. For fine-tuning the position of the optical lens, the optical disc drive comprises a lens platform which carries the objective lens and which is displaceably mounted with respect to said sledge. The displacement range of the platform with respect to the sledge is relatively small, but the positioning accuracy of the platform with respect to the sledge is larger than the positioning accuracy of the sledge with respect to the frame.

The format of data storage in an optical disc is standardised, as is the speed of data transfer, which is associated with the rotational speed of the disc. However, there is a general desire for increasing the speed of data transfer when reading or writing data from/to the disc. Such increase of the data transfer rate involves an increase in the rotational speed of the disc. Thus, disc drives have been designed which are capable of handling an optical disc at 2×, 4×, 8× . . . the standard rotational speed. A problem in this respect is that the centre of mass of the optical disc is usually not aligned exactly at its rotation centre. This may be caused for instance by the fact that the disc is not a one hundred percent perfect circle, or by the fact that the central hole of the disc is placed not exactly in its centre. As a consequence, at increasing rotational speed, vibrations might occur which may be disadvantageous for the mechanism and which may produce an undesirable noise. In order to prevent this from happening, it is desirable to detect any unbalance of a disc and, if it is found that the balance is worse than acceptable, to reduce the rotational speed of the disc.

Thus, in a start-up phase, for instance when the optical disc drive is switched on, or when a write session or read session is initiated, it is desirable that the disc drive does not simply use the highest possible rotational speed but, in contrast, tries to slowly (stepwise) increase the rotational speed, starting at the standard speed, to find whether the current disc can be played at high speed without vibrations. If no vibrations occur, a higher speed can be tried. If vibrations occur, the operational speed is set to a slower speed without vibrations. It is even possible that vibrations occur during operation, in which case the operational speed can be lowered as well.

Thus, there is a desire for a method of detecting vibrations. It is of course possible to provide a separate vibration detector. However, this involves additional hardware and additional costs. In a preferred method, which uses the output signal of the optical detector, no additional vibration detector is necessary.

The problem as described above is already known, and a method for measuring the unbalance of an optical disc based on processing the optical read signal is already known, too. By way of example, reference is made to European patent application 1.049.086. In this publication, a method is described for deriving from the optical signal a measuring signal which is said to be indicative of the vibrations; if the vibrations are found to be too severe, the allowable speed of the optical disc is reduced. More particularly, the method of this publication uses the tracking error signal, which means in fact that the method is based on determining how the optical lens and the tracks are vibrating with respect to each other.

The basic idea behind this prior art approach is the consideration that the disc is fixed to the frame of the disc drive apparatus, so that the tracking error signal should contain information on the vibration of the optical lens with respect to the frame. A problem in this prior art method is, however, that such vibration detection signal is also generated if the tracks are "vibrating" while the mechanism is, in fact, not. Such may be caused for instance by the fact that, in practice, tracks may be not exactly circular in shape, and/or they may be arranged eccentrically with respect to the rotation axis of the disc. Thus, even if there is no unbalance at all, the measuring method of the publication will provide a vibration signal due to inaccuracy of the tracks. For this reason, the method of the publication is complicated by needing several calibration steps at lower speed, in order to find how any possible inaccuracy of the tracks contributes to the vibration signal (track-crossing related signal component), and by needing to take this contribution into account in the actual vibration measurement.

It is an objective of the present invention to provide a method which is capable of deriving a measuring signal which does not have the above-mentioned disadvantages of being sensitive to track-related inaccuracies and therefore not needing track-crossing related calibration steps. More specifically, it is an objective of the present invention to provide a measuring method capable of providing a measuring signal directly indicative of vibration of the mechanism.

A key aspect of the present invention is the insight that, in case of mechanical vibrations, the platform will also vibrate with respect to the sledge. Based on this insight, the present invention proposes to provide a signal representing the vibration of platform and sledge with respect to each other, and to analyse this signal in order to determine whether or not the vibrations are too severe or, conversely, below an acceptability level.

When the sledge and the platform are vibrating with respect to each other, there may exist a differential acceleration, a differential velocity and a differential position. In the present text, the phrase "displacement" is used to cover "being in a displaced condition" (distance as a function of time) as well as to cover "undergoing an action of displacing" (velocity as a function of time; first derivative of distance).

In one embodiment, differential velocity of the optical lens with respect to the sledge is measured, for instance by measuring the back electromotive force (emf) of the platform actuator. It is noted that a similar embodiment can be applied in the case of a magnetic disc system, in which case the displacement of a magnetic pickup with respect to the sledge is measured by measuring the back electromotive force (emf) of the platform actuator.

In another embodiment, differential position of the optical lens with respect to the sledge is measured. In this respect, a particularly useful embodiment of the present invention is based on the further recognition that an output signal of an optical detector contains at least one signal component which corresponds to the radial displacement of the optical lens with respect to the light beam, as well as on the further recognition that this beam has a fixed location with respect to the sledge, so that said signal component corresponds to the radial displacement of the optical lens with respect to the sledge. Thus, based on this recognition, the present invention proposes to process an output signal of the optical detector such as to provide a signal component corresponding to the radial displacement of the optical lens with respect to the sledge, and to use this signal component as input signal for a controller controlling the sledge actuator.

In this respect it is noted that in the prior art as disclosed in said publication EP-1.049.086, the output signal of the optical detector is processed to provide the tracking error signal, whereas any signal component corresponding to the radial displacement of the optical lens with respect to the sledge is disregarded.

In the following, any signal which is representative of radial displacement of the objective lens with respect to the sledge will be referred to as X-displacement signal.

In the case of vibrations, the disc drive apparatus constitutes in fact a system of three masses coupled to each other, which are all vibrating. These three masses are: the apparatus frame, the sledge, and the platform. The frame and the sledge are vibrating with respect to each other, and the sledge and the platform are vibrating with respect to each other. In order to assure that the X-displacement signal reflects the vibrations of the frame, it is preferred that the frame and the platform are vibrating with respect to each other. To this end, it is desirable that the stiffness of the coupling between sledge and frame is as high as possible. It may be that, in a specific type of disc drive apparatus, the radial actuator is of a type having a sufficiently high intrinsic stiffness. However, in a preferred embodiment, steps are taken to increase said stiffness during vibration measurement. In an exemplary embodiment, which is preferred in view of its relative simplicity, the radial actuator is energized to bring the sledge to an end stop and to continue pressing the sledge against this end stop, so that effectively the frame and the sledge now form one vibrating mass.

The optical detector signal after processing, i.e. in the X-displacement signal, may still contain signal components which are related to track-crossing rather than mechanical vibrations. Such track-crossing related signal components may be stronger or weaker, depending on the type of optical detector signal. For instance, in the case of a three-spot push-pull signal, the contribution of track-crossing related signal components may be very small. If, however, the contribution of track-crossing related signal components is substantial, it may be desirable to reduce this contribution.

In this respect, the present invention proposes a further improvement which is based on the understanding that, in the optical detector signal, those track-crossing related signal components on the one hand, and those vibration-related signal components on the other hand, have associated frequencies located in different frequency ranges. Typically, even under normal, i.e. "vibration-free", circumstances, during one revolution of a disc, the optical detector will have "seen" in the order of 10 to 40, or even more, track-crossings. For instance, if a high speed disc is rotated with a speed of 100–150 revolutions per second, a vibration-related measuring signal is expected in the range of 100–150 Hz, whereas track-crossing related signal components are expected to vary between zero and 7500 Hz or even higher. Only within a period having a relatively small duration, the track-crossing related signal components will have a frequency in the same order as the vibration-related measuring signal.

Thus, in a preferred embodiment, the present invention proposes to use a filter capable of selectively passing signal components having a frequency within the range corresponding to expected mechanical vibrations.

The frequency range corresponding to expected mechanical vibrations depends on the rotational speed of the disc. In the start-up phase, when the disc tries to find the highest possible rotational speed to be used with the current disc, the rotational speed is not constant. Therefore, said filter preferably is adaptable in accordance with the actual disc speed.

Figure 1B:
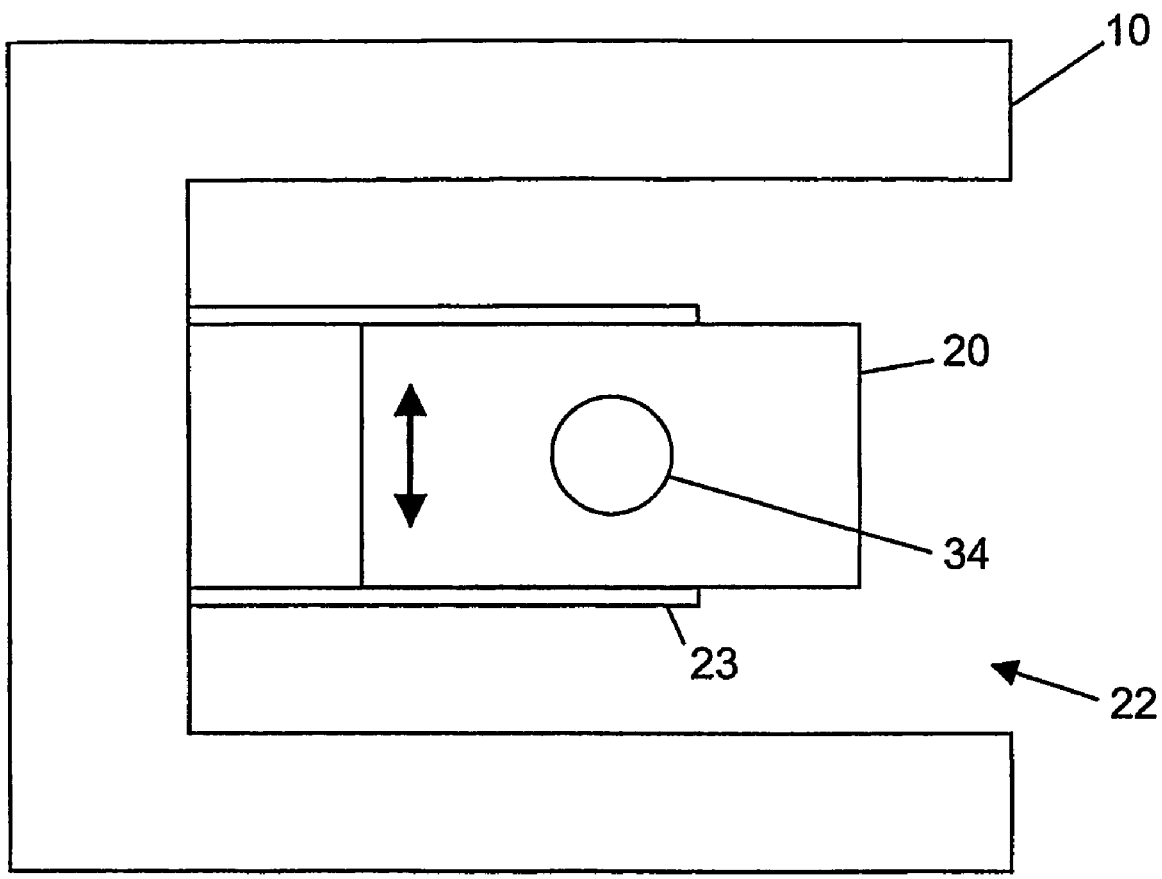

These and other aspects, features and advantages of the present invention will be further explained by the following description of the present invention with reference to the drawings, in which same reference numerals indicate same or similar parts, and in which:

FIG. 1A schematically shows displaceable components of an optical disc drive;

FIG. 1B schematically shows a sledge/platform combination; and

FIG. 2 is a flow diagram illustrating steps in a start-up phase of the disc drive in accordance with the present invention.

FIG. 1A schematically illustrates an optical disc drive 1, suitable for storing information on or reading information from an optical disc 2. The disc drive apparatus 1 comprises an apparatus frame 3. For rotating the disc 2, the disc drive apparatus 1 comprises a motor 4 fixed to the frame 3, defining a rotation axis 5. For receiving and holding the disc 2, the disc drive apparatus 1 may comprise a turntable or clamping hub 6, which in the case of a spindle motor 4 is mounted on the spindle axle 7 of the motor 4.

The disc drive apparatus 1 further comprises a displaceable sledge 10, which is displaceably guided in the radial direction of the disc 2, i.e. in a direction substantially perpendicular to the rotation axis 5, by guiding means not shown for the sake of clarity. A mechanical end stop for the sledge 10 with respect to the apparatus frame 3 is schematically indicated at 16. A radial sledge actuator, designed for regulating the radial position of the sledge 10 with respect to the apparatus frame 3, is schematically indicated at 11. The force exerted by this actuator 11 is schematically indicated as arrows F. Since radial sledge actuators are known per se, while the present invention does not relate to the design and functioning of such radial sledge actuator, it is not necessary here to discuss the design and functioning of a radial sledge actuator in great detail. It is noted, however, that the actuator 11 constitutes a radial coupling between the sledge 10 and the frame 3, which coupling has characteristics of elasticity, stiffness and damping, as is shown schematically at 12.

The disc drive apparatus 1 further comprises a displaceable platform 20, which is displaceable in the radial direction of the disc 2 with respect to the sledge 10, and which is displaceably mounted with respect to the sledge 10 by mounting means not shown for the sake of clarity. A radial platform actuator arranged for radially displacing the platform 20 with respect to the sledge 10, is indicated at 21. Since such platform actuators are known per se, while further the design and operation of such platform actuator is no subject of the present invention, it is not necessary here to discuss the design and operation of such platform actuator in great detail. It is noted, however, that the actuator 21 constitutes a radial coupling between the platform 20 and the sledge 10, which coupling has characteristics of elasticity, stiffness and damping, as is shown schematically at 22.

FIG. 1B schematically illustrates a possible way of mounting the platform 20 with respect to the sledge 10. In the embodiment illustrated, the coupling 22 comprises spring wires 23, i.e. relatively thin, substantially one-dimensional members having their longitudinal axis directed approximately in the Y-direction, i.e. approximately perpendicular to the X-direction (radial direction) and the Z-direction (axial direction of light beam). These spring wires hold the platform 20 with respect to the sledge 10 in the absence of any external supportive forces. However, in the case of an external force exerted on the platform 20, the spring wires 23 bend relatively easily to allow a displacement of the platform 20 with respect to the sledge 10 in the X-direction and Z-direction. The spring wires 23 may have equal stiffness in X-direction and Z-direction, but it is also possible that the stiffness in Z-direction differs from the stiffness in X-direction.

A mounting of the platform 20 involving spring wires 23 to hold the platform 20 with respect to the sledge 10 is known per se. It is noted that the present invention is not limited to a mounting design involving spring wires: any other suitable mounting design can be used in the context of the present invention. However, it is important that the stiffness or elasticity of the mounting means, in this example the spring wires, involves a resonance frequency which is relatively low as compared to expected mechanical vibrations of the platform 20 with respect to the sledge 10 such as to allow radial displacement of platform 20 and sledge 10 with respect to each other in the presence of such vibrations.

The disc drive apparatus 1 further comprises an optical system 30 for scanning tracks (not shown) of the disc 2 by an optical beam. More specifically, the optical system 30 comprises a light beam generating means 31, typically a laser such as a laser diode, which may be mounted with respect to the apparatus frame 3 or the sledge 10, and which is arranged to generate a light beam 32a which passes a beam splitter 33 and an objective lens 34 carried by the platform 20. The objective lens 34 focuses the light beam 32b on the disc 2. It is noted that the disc drive apparatus 1 also comprises focus servo means arranged for axially displacing the platform 20 in order to achieve and maintain focusing of the light beam 32b exactly on the desired location of the disc 2, but such focus servo means are not illustrated in FIG. 1 for sake of clarity.

The light beam 32b reflects from the disc 2 (reflected light beam 32c) and passes the objective lens 34 and the beam splitter 33 (beam 32d) to reach an optical detector 35 mounted with respect to the sledge 10. The optical detector 35 produces a read signal $S_R$.

Thus, the light beam 32 follows an optical path 80 which is substantially fixed with respect to the sledge 10.

The disc drive apparatus 1 further comprises a control unit 90 having a first output 90a connected to a control input of the motor 4, having a second output 90b coupled to a control input of the radial sledge actuator 11. The control unit 90 is designed to generate at its first output 90a a control signal $S_{CM}$ for the motor 4, and to generate at its second control output 9b a control signal $S_{CS}$ for the sledge actuator 11 in order to control said force F.

As should be clear to a person skilled in the art, the read signal $S_R$ comprises at least one signal component which depends on the radial displacement of the objective lens 34 with respect to the light beam 32. Hence, this signal component corresponds to the displacement of the objective lens 34 with respect to the sledge 10. An example of such signal component, and a method and device for deriving such signal component from the read signal $S_R$, are disclosed in U.S. Pat. No. 5,173,598, the contents of which is incorporated here by reference. Such signal component as described in said publication can be used in practicing the present invention.

In the following, any signal which is representative of radial displacement of the objective lens 34 with respect to the sledge 10 will be referred to as X-displacement signal $S_{XD}$.

Such X-displacement signal $S_{XD}$ needs not necessarily be derived from the optical read signal $S_R$. Within the context of the present invention, it is possible to derive an X-displacement signal $S_{XD}$ from other sources. For instance, in a case where the radial platform actuator 21 comprises an electromagnetic device, a displacement of the platform 20 with respect to the sledge 10 will induce a back-EMF in such electromagnetic device; such back-EMF is perfectly suitable to be received by the control unit 90 in order to be used as X-displacement signal $S_{XD}$. However, in the following, the present invention will be further explained referring to an exemplary embodiment wherein the X-displacement signal $S_{XD}$ is derived from the optical read signal $S_R$, without such explanation being intended to restrict the present invention to such embodiment.

In the exemplary embodiment illustrated in FIG. 1A, the control unit 90 further has a read signal input 90d for receiving the read signal $S_R$ from the optical detector 35, and the control unit 90 is designed for deriving from the read signal $S_R$ an X-displacement signal $S_{XD}$. The control unit 90 is further designed to provide this X-displacement signal $S_{XD}$ at an X-displacement output 90f to a decision unit 91.

The control unit 90 may provide this X-displacement signal $S_{XD}$ to the decision unit 91 directly. However, preferably, and as illustrated, in order to increase the sensitivity for vibrations relating to the disc rotation, the X-displacement signal $S_{XD}$ is filtered by an adaptive band filter 70 having a central frequency corresponding to the rotation frequency of the disc. Thus, adaptive filter 70 has an input 70a coupled to output 90f of control unit 90. The adaptive filter 70 further has a control input 70c, receiving a control input signal ω indicating the rotation frequency of the disc 2. This control input signal ω may be generated by the control unit 90, which controls the motor 4, or it may be generated by a tacho detector (not shown) associated with the motor 4, as will be clear to a person skilled in the art.

The decision unit 91 may receive the filtered X-displacement signal $S_{XD}$ directly. However, in the embodiment as illustrated, an output 70b of the adaptive filter 70 is coupled to a converter 71, for instance an AC/DC converter, which generates a constant level output signal σ indicating the amplitude of the output signal of the adaptive filter 70. This converter output signal σ, which will be indicated as "rectified X-displacement signal", is provided to an input of decision unit 91. Instead of a separate converter 71, such converter may also be incorporated in the decision unit 91.

Since the X-displacement signal $S_{XD}$ is representative for the displacement of platform 20 with respect to sledge 10, this signal will be sine-shaped in the case of vibrations. The rectified X-displacement signal σ, corresponding to the amplitude of the X-displacement signal $S_{XD}$, is therefore representative for the intensity of such vibrations.

The decision unit 91 investigates the rectified X-displacement signal σ to determine whether this signal indicates high intensity vibrations. Depending on the outcome of such investigation, the decision unit 91 will return a limit signal $S_L$ to a second input 90g of the control unit 90.

It is noted that the control unit 90, the filter 70, the converter 71, and the decision unit 91 are illustrated and discussed here as separate units, exchanging signals $S_{XD}$, σ and $S_L$. Although such separate implementation is feasible indeed, said components are, in a preferred embodiment, integrated as one single unit. Further, although the decision unit 91 may be implemented as a separate hardware device, the operation of the decision unit 91 is preferably implemented as a suitable programming of an integrated control and decision unit 90, either in software, hardware or firmware.

On the other hand, it is also possible to have the detector output signal $S_R$ received and to have the X-displacement signal ($S_{XD}$) derived therefrom by a component separate from the control unit 90.

In the following, a method 200 for setting the rotational speed of the disc 2 in a start-up phase of the disc drive apparatus 1 will be explained with reference to FIG. 2.

First, the light beam generating device 31 is switched on (step 201), the motor 4 is energized to rotate the disc (step 202) at an initial rotational speed, and a focus actuator (not shown) is activated (step 203), such as to obtain a detector output signal $S_R$ for the control unit 90.

Then, the radial sledge actuator 11 is energized (step 204) so that said force F moves the sledge 10 towards an end position as defined by said end stop 16. After having reached the end stop 16, the control unit 90 continues to energize the radial sledge actuator 11 such as to press the sledge 10 firmly against the end stop 16.

The central pass frequency of the band pass filter 70 is set to correspond to the rotational frequency ω of the disc (step 205).

The control unit 90 receives the detector output signal $S_R$ (step 206), and derives therefrom (step 207) the X-displacement signal $S_{XD}$. This X-displacement signal $S_{XD}$ is filtered by filter 70 (step 208) and rectified by converter 71 (step 209) to yield the rectified X-displacement signal σ.

This rectified X-displacement signal σ is compared to a predefined threshold level T (step 210), which defines an acceptability level for the intensity of vibration.

If the decision unit 91 finds that the intensity of vibration is acceptable, the decision unit 91 sends a corresponding signal back to the control unit 90. If the current rotational speed of the disc is the maximum speed of the system, the operational speed of the motor 4 of the apparatus is set to this maximum rotational speed (step 211) and this procedure of the start-up phase is over. Otherwise, the control unit 90 generates its control signal $S_{CM}$ to instruct the motor 4 to operate at a higher speed (step 212), and the above steps 205–210 are repeated, indicated as a return step 213.

In contrast, if the decision unit 91 finds that the intensity of vibration is unacceptably high, the decision unit 91 sends a corresponding signal back to the control unit 90. In response, the control unit 90 generates its control signal $S_{CM}$ to instruct the motor 4 to operate at the previous lower speed (step 214), and this procedure of the start-up phase is over.

It is also possible that, while energizing the sledge actuator 11, the control unit 90 also generates a platform control signal in order to energize the radial platform actuator 21. The control unit 90 receives the detector output signal $S_R$ (step 206), and derives therefrom (step 207) the X-displacement signal $S_{XD}$. Based on this signal, the control unit 90 forms a control loop with the detector 35 and the radial platform actuator 21, such as to try to effectively fix the platform 20 to the sledge 10. In other words, the control unit 90 generates its platform control signal such that the X-displacement signal $S_{XD}$ is substantially maintained at zero. Now, the X-displacement signal $S_{XD}$ itself is less reliable as a signal indicating vibration of the platform, because the control action of the control unit 90 has reduced the magnitude of the differential velocity and the differential position of the platform 20 with respect to the sledge 10. However, the platform control signal, which reflects the force needed to effectively counteract the differential velocity and the differential position, reflects the deceleration or acceleration of the sledge and can be used as measuring signal. So, in such case, the platform control signal is compared to a threshold in an alternative step 210, after which the procedure proceeds with steps 211, 212 or 214 as described above.

It should be clear to a person skilled in the art that the present invention is not limited to the exemplary embodiments discussed above, but that various variations and modifications are possible within the protective scope of the invention as defined in the appending claims. For instance, instead of using a band pass filter for filtering a detection signal, other adaptive detection methods can be used.

The invention is claimed is:

1. A method for detecting vibrations in a disc drive apparatus for rotating a disc and having radially displaceable scan means with a sledge radially displaceable with respect to an apparatus frame and a platform radially displaceable with respect to said sledge;
the method comprising the acts of detecting a radial displacement of said platform with respect to said sledge;
receiving a detector output signal by an adaptable filter;
receiving, at a command input of the adaptable filter, a signal representing a rotation frequency of said disc to adapt the adaptable filter;
an outputting a filtered detector signal from an output of the adaptable filter.

2. The method according to claim 1, further comprising the act of detecting a back-EMF in an electromagnetic device of the disc drive apparatus in an actuator for displacing said platform with respect to said sledge.

3. The method according to claim 1, further comprising the act of detecting an optical read signal from a detector of the disc drive apparatus and deriving therefrom an X-displacement signal.

4. The method according to claim 1, further comprising the acts of:
activating an actuator such as to counteract the radial displacement of said platform with respect to said sledge; and
detecting an actuator control signal.

5. The method according to claim 3, further comprising the act of filtering said X-displacement signal in association to a disc rotation frequency.

6. The method according to claim 3, further comprising the act of providing a rectified X-displacement signal indicating amplitude of said X-displacement signal.

7. The method according to claim 1, wherein the sledge is kept pressed against a frame or a stop fixed to said frame.

8. The method of claim 1, further comprising the acts of:
selecting an initial rotational speed;
detecting a vibration;
increasing the initial rotational speed if the detected vibration is below an acceptability level;
decreasing the initial rotational speed to a previous acceptable rotational speed if the detected vibration is above an acceptability level.

9. A disc drive apparatus, comprising;
rotating means for rotating a disc;
radially displaceable scan means including a sledge radially displaceable with respect to an apparatus frame and a platform radially displaceable with respect to said sledge;
vibration detection means for detecting vibrations caused by the rotating disc;
an adaptable filter means having an input receiving a detector output signal; the adaptable filter means further having a command input coupled to receive a signal representing a rotation frequency of the disc to adapt the adaptable filter means, and having an output for providing a filtered detector signal;
said vibration detection means comprising radial displacement detection means for detecting a radial displacement of said platform with respect to said sledge.

10. The apparatus according to claim 9, further comprising:
an electro-motive platform actuator for displacing said platform with respect to said sledge;
wherein said radial displacement detection means are designed to detect a back-EMF in said electro-motive platform actuator.

11. The apparatus according to claim 9, further comprising:
an optical system for scanning a disc, the optical system defining an optical path which is substantially fixed with respect to the sledge and comprising an optical element which is fixed with respect to the platform;
wherein said radial displacement detection means are designed to detect an optical read signal and to derive therefrom an X-displacement signal.

12. The apparatus according to claim 9, further comprising;
an actuator for exerting a radial force on said platform with respect to said sledge; and
a control unit generating an actuator control signal for activating said actuator such as to effectively counteract the radial displacement of said platform with respect to said sledge.

13. The apparatus according to claim 11, further comprising a converter configured to rectify said X-displacement signal.

14. The apparatus according to claim 9, further comprising a control unit for controlling said rotating means;
said control unit being responsive to said radial displacement detection means to reduce speed of said rotating means when said radial displacement detection means indicates that said platform vibrates with respect to said sledge in excess of a threshold.

15. The apparatus according to claim 14, wherein said control unit is designed, in an initializing phase, to set the rotation speed of the rotating means at an initial value;
to check the amplitude of any vibration of the platform with respect to the sledge;
to increase said rotational speed if the intensity of the detected vibration is below an acceptability level;
to decrease said rotational speed to a previous acceptable rotational speed if the intensity of the detected vibration is above an acceptability level;
to set the operational rotational speed of said rotating means to be equal to said previous acceptable rotational speed or, if no unacceptable vibration is detected, to be equal to the maximum rotational speed of the apparatus.

16. The apparatus according to claim 15, wherein said control unit is designed to control a radial sledge actuator such as to keep the sledge pressed firmly against the apparatus frame or a stop fixed to said apparatus frame.

17. The method of claim 3, further comprising the act of providing a rectified actuator control signal indicating amplitude of said X-displacement signal.

18. The method of claim 5, further comprising the act of providing a command signal to a filter that is configured to perform filtering act, said command signal representing said disc rotation frequency.

19. The apparatus of claim 12, further comprising a converter configured to rectify said actuator control signal.

* * * * *